US006675380B1

(12) United States Patent
McKinsey et al.

(10) Patent No.: US 6,675,380 B1
(45) Date of Patent: Jan. 6, 2004

(54) PATH SPECULATING INSTRUCTION SCHEDULER

(75) Inventors: Chris M. McKinsey, Alpharetta, GA (US); Jayashankar Bharadwaj, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/439,584

(22) Filed: Nov. 12, 1999

(51) Int. Cl.$^7$ ................................................ G06F 9/45
(52) U.S. Cl. ........................................ 717/161; 717/157
(58) Field of Search .................. 717/161, 154–157, 717/159–160

(56) References Cited

U.S. PATENT DOCUMENTS

| | | | |
|---|---|---|---|
| 5,619,502 A | | 4/1997 | Kahn et al. .................. 370/397 |
| 5,724,565 A | * | 3/1998 | Dubey et al. ................ 712/245 |
| 5,842,036 A | | 11/1998 | Hinton et al. .......... 395/800.23 |
| 6,032,244 A | * | 2/2000 | Moudgill ...................... 712/23 |

OTHER PUBLICATIONS

Bala et al., "Efficient Instruction Scheduling Using Finite State Automata", IEEE, pp.: 46–56, Dec. 1995.*
Park et al., "Evaluation of Scheduling Techniques on a SPARC–Based VLIW Testbed", IEEE, pp.: 104–113, 1997.*
Krishnamurthy, S.M., "A Brief Survey of Papers on Scheduling for Pipelined Processors", *SIGPLAN Notices, Vol. 25*, A Monthly Publication of the Special Interest Group on Programming Languages, 97–106, (Jul. 1990).
Smotherman, M., et al., "Efficient DAG Construction and Heuristic Calculation for Instruction Scheduling", *Proceedings of the 24th Annual International Symposium on Microarchitecture*, 93–102, (Nov. 18–20, 1991).
Bernstein, D., et al., "Code Duplication: An Assist for Global Instruction Scheduling", *Proceedings of the 24th Annual International Symposium on Microarchitecture*, 103–113, (Nov. 1991).

* cited by examiner

*Primary Examiner*—Tuan Dam
*Assistant Examiner*—Ted T. Vo
(74) *Attorney, Agent, or Firm*—Schwegman, Lundberg, Woessner & Kluth, P.A.

(57) ABSTRACT

Path speculating instruction scheduler. According to one embodiment of the present invention instructions are placed into a control flow graph having blocks of the instructions, the control flow graph defining a number of paths of control flow through the blocks of instructions. A list of candidate instructions to be scheduled into a target block in the control flow graph for execution is built, and one of the candidate instructions is selected to be scheduled into the target block based on whether a single copy on a path property for the selected instruction in the target block will be maintained or terminated on one or more paths through the target block.

18 Claims, 14 Drawing Sheets

PATH SPECULATING INSTRUCTION SCHEDULER

FIELD OF THE INVENTION

The present invention pertains to the field of computer architecture, and more particularly to a path speculating instruction scheduler.

BACKGROUND

A computer program, also called software, is executed by a computer system as a series of instructions. An instruction is a command to a processor in the computer system to perform a basic logical or mathematical operation such as an add, a subtract, or a load from memory. A compiler translates source language code of the software into a series of instructions, and then schedules the instructions for execution by the processor. The processor fetches and executes the instructions according to the schedule in what is called an instruction stream.

Operands are required to execute each instruction, and are available as immediate data in the instruction stream or as a result of the execution of another instruction. For example, an instruction stream comprising instructions 51 and 52 may be defined by the following operands:

instruction 51: a=5+3 instruction 52: b=a*9

The instruction 51 has both of its operands, the constant values 5 and 3, immediately available in the instruction stream. However, the operand a for instruction 52 is a result of the execution of instruction 51. An instruction, such as instruction 52, which requires the execution result of another instruction for an operand is referred to as a data dependent instruction or a data successor. An instruction, such as instruction 51, that provides an operand for a data dependent instruction is referred to as a source instruction or a data predecessor.

Conventional computer systems have in-order execution pipelines to execute instructions. An in-order execution processor usually fetches an instruction stream from a memory and executes each instruction in the instruction stream according to a sequential program order. Accordingly, an instruction in an in-order execution processor generally begins execution after the execution of prior instructions in the program order. A delay in the execution of an earlier instruction in the program order can delay the execution of a later instruction. Such delays may have several causes. For example, the earlier instruction may need to wait for an operand to be fetched from an external data storage device. The resulting delay in the beginning of the execution of the later instruction similarly delays the beginning of execution of succeeding instructions in the program order.

Instructions can be scheduled out of order to improve the instruction execution performance of a processor. The instructions may be scheduled out of order according to the availability of resources required to execute each instruction. More particularly, later instructions in a program order that have the resources required for execution available may be scheduled for execution ahead of earlier instructions in the program order. The instruction execution performance of a processor that executes instructions scheduled out of order may be enhanced over in-order execution processors because a delay in the execution of earlier instructions in the program order typically does not delay the execution of later instructions in the program order.

There remains a need for improved methods of scheduling instructions for execution such that a processor may execute the instructions more rapidly.

SUMMARY OF THE INVENTION

According to one embodiment of the present invention instructions are placed into a control flow graph having blocks of the instructions, the control flow graph defining a number of paths of control flow through the blocks of instructions. A list of candidate instructions to be scheduled into a target block in the control flow graph for execution is built, and one of the candidate instructions is selected to be scheduled into the target block based on whether a single copy on a path property for the selected instruction in the target block will be maintained or terminated on one or more paths through the target block.

Advantages of the invention will be apparent to one skilled in the art upon an examination of the detailed description.

DETAILED DESCRIPTION

In the following detailed description of exemplary embodiments of the present invention, reference is made to the accompanying drawings which form a part hereof, and in which are shown by way of illustration specific exemplary embodiments in which the present invention may be practiced. These embodiments are described in sufficient detail to enable those skilled in the art to practice the present invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the claims.

Figure 1:
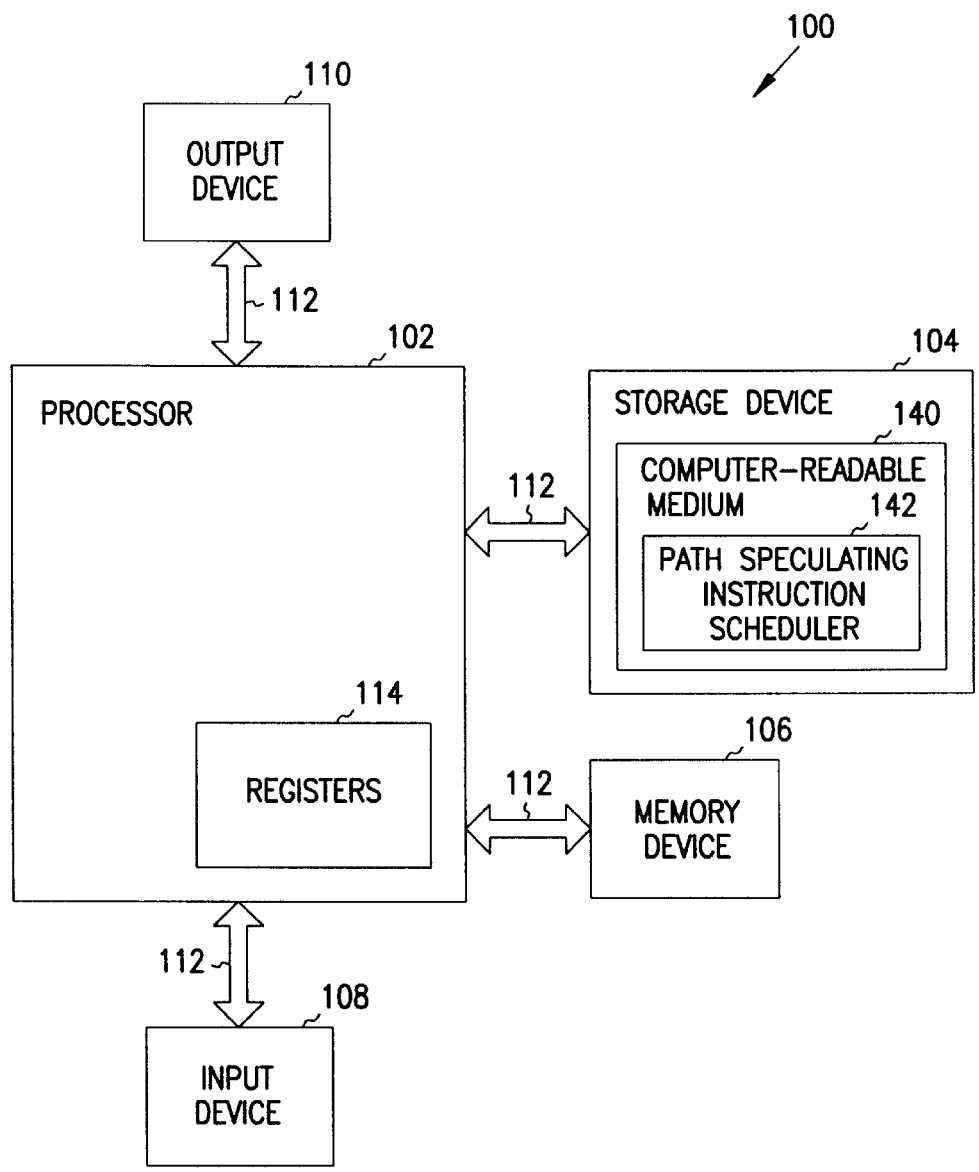
FIG. 1 is a block diagram of an information-handling system according to an embodiment of the present invention.

A path speculating instruction scheduler is implemented in a system such as an information-handling system 100 shown in a block diagram in FIG. 1 according to an embodiment of the present invention. The information-handling system 100 includes a processor 102, a storage device 104, a memory device 106, an input device 108, and an output device 110. The storage device 104 may be a hard disk drive, a floppy disk drive, an optical disk drive, or a tape cartridge drive. The memory device 106 may be a random-access memory (RAM), a read-only memory (ROM), or a cache memory. The input device 108 may be a pointing device such as a mouse, a keyboard, or a modem. The output device 110 may be a monitor or a printer. Devices in the information-handling system 100 including the processor 102, the data storage device 104, the memory device 106, the input device 108, and the output device 110 communicate with each other through a suitable bus system 112 connected to the devices. The processor 102 also includes a number of registers 114.

The storage device 104 includes a computer-readable medium 140 comprising computer-readable instructions. The computer-readable medium 140 may be a magnetic disk such as a floppy disk, a CD-ROM, or any other computer-readable medium known to those skilled in the art. The computer-readable instructions may comprise a program for a path speculating instruction scheduler 142 according to embodiments of the present invention.

Figure 2:
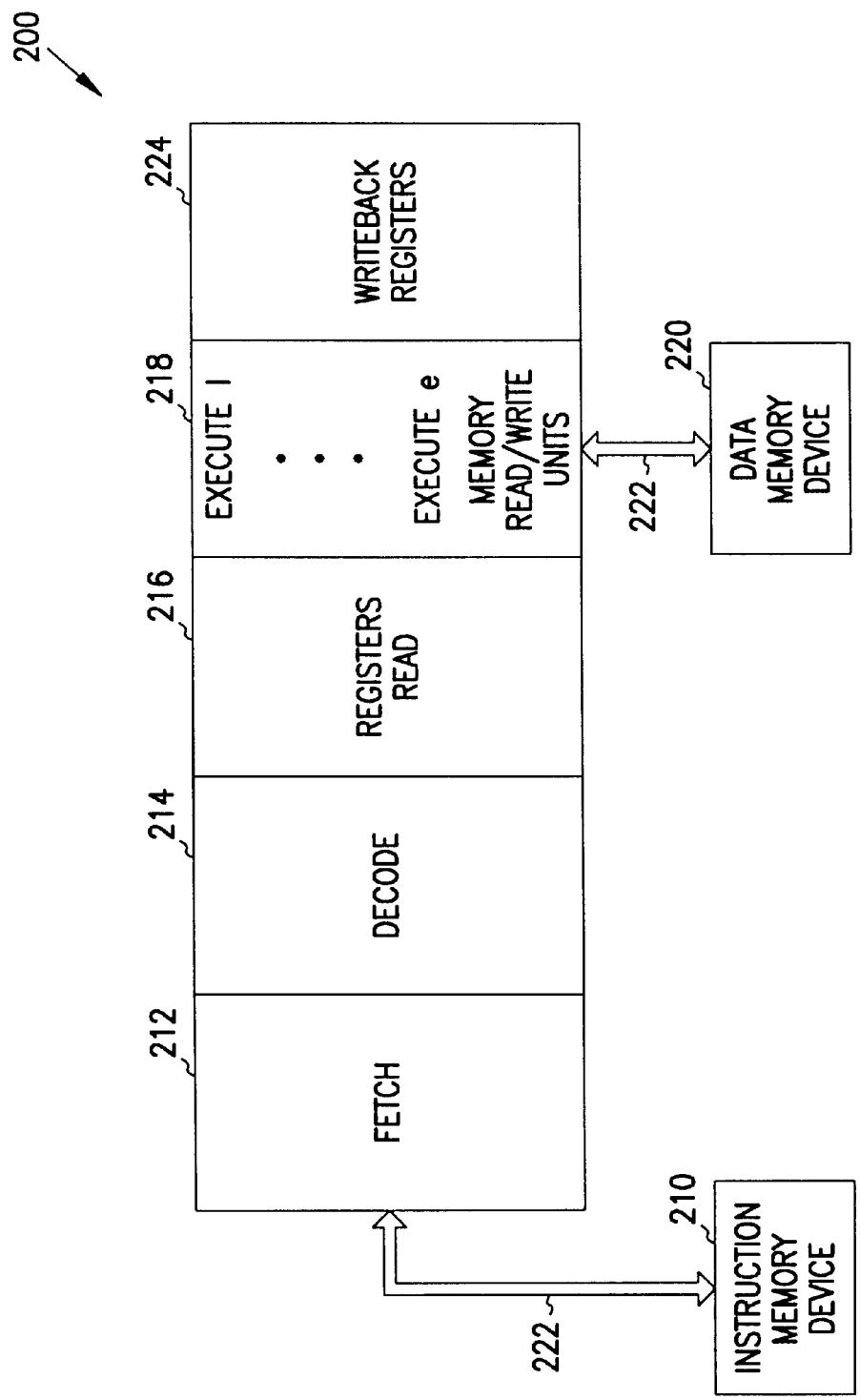
FIG. 2 is a block diagram of a processor pipeline according to an embodiment of the present invention.

Circuits which execute instructions in the processor 102 may be represented as a pipeline to illustrate the progression of instructions through the processor 102. A processor pipeline 200 is shown in a block diagram in FIG. 2 according to an embodiment of the present invention. The pipeline 200 fetches instructions for each machine cycle from an instruction memory device 210 with a fetch circuit 212. A machine cycle is one cycle in a series of cycles of operation of the processor 102 in which instructions are executed. Each instruction may be executed in one or more contiguous machine cycles.

The instruction memory device 210 holds instructions compiled by a compiler, and the fetch circuit 212 fetches the instructions in an instruction stream according to scheduling information embedded in the instructions. The instructions are decoded in a decode circuit 214, and registers 216 in the processor 102 are read to acquire data values to be used in executing the instructions. The instructions are executed by a number of execution units 218, shown as execution units 1-e, in one or more machine cycles. The execution units 218 include Arithmetic Logic Units (ALUs), Branch Units, Load Storage Units, Floating Point Units, and Multi-Media Units. The execution units 218 include memory read/write units to exchange appropriate data with a data memory device 220 as the instructions are being executed. The instruction memory device 210 and the data memory device 220 may be the same device, and exchange information with other circuits in the pipeline 200 over a suitable bus system 222. Results of the execution of the instructions are written to registers 224 and are made available for the next machine cycle.

Figure 3:
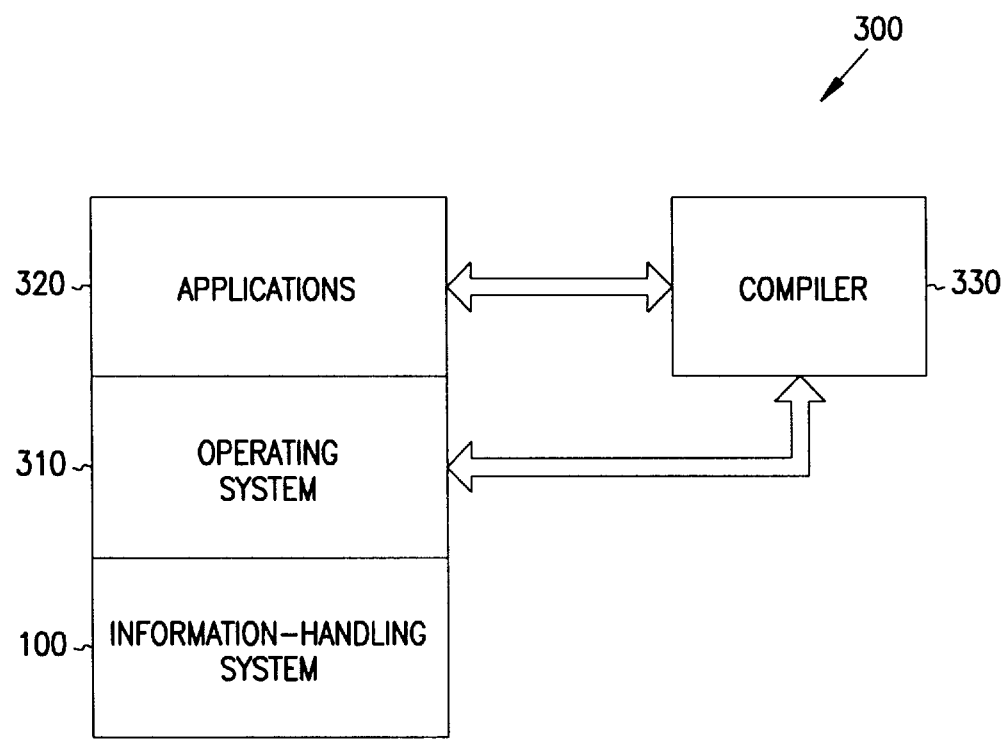
FIG. 3 is a block diagram of software to operate the information-handling system of FIG. 1 according to an embodiment of the present invention.

The information-handling system 100 operates according to a hierarchical structure of software 300 that is shown in a block diagram in FIG. 3 according to an embodiment of the present invention. An operating system 310 manages resources in the information-handling system 100. For example, the operating system 310 manages communications between the processor 102, the storage device 104, the memory device 106, the input device 108, and the output device 110 over the bus system 112. Various applications 320 are implemented by the information-handling system 100. Examples of the applications 320 include word-processing software and spreadsheet software. Source language code for the applications 320 and the operating system 310 are compiled by a compiler 330 into instructions executable by the processor 102. The compiler 330 is also software. The operating system 310, the applications 320, and the compiler 330 are implemented in computer-readable instructions stored in the computer-readable medium 140 shown in FIG. 1.

Figure 4:
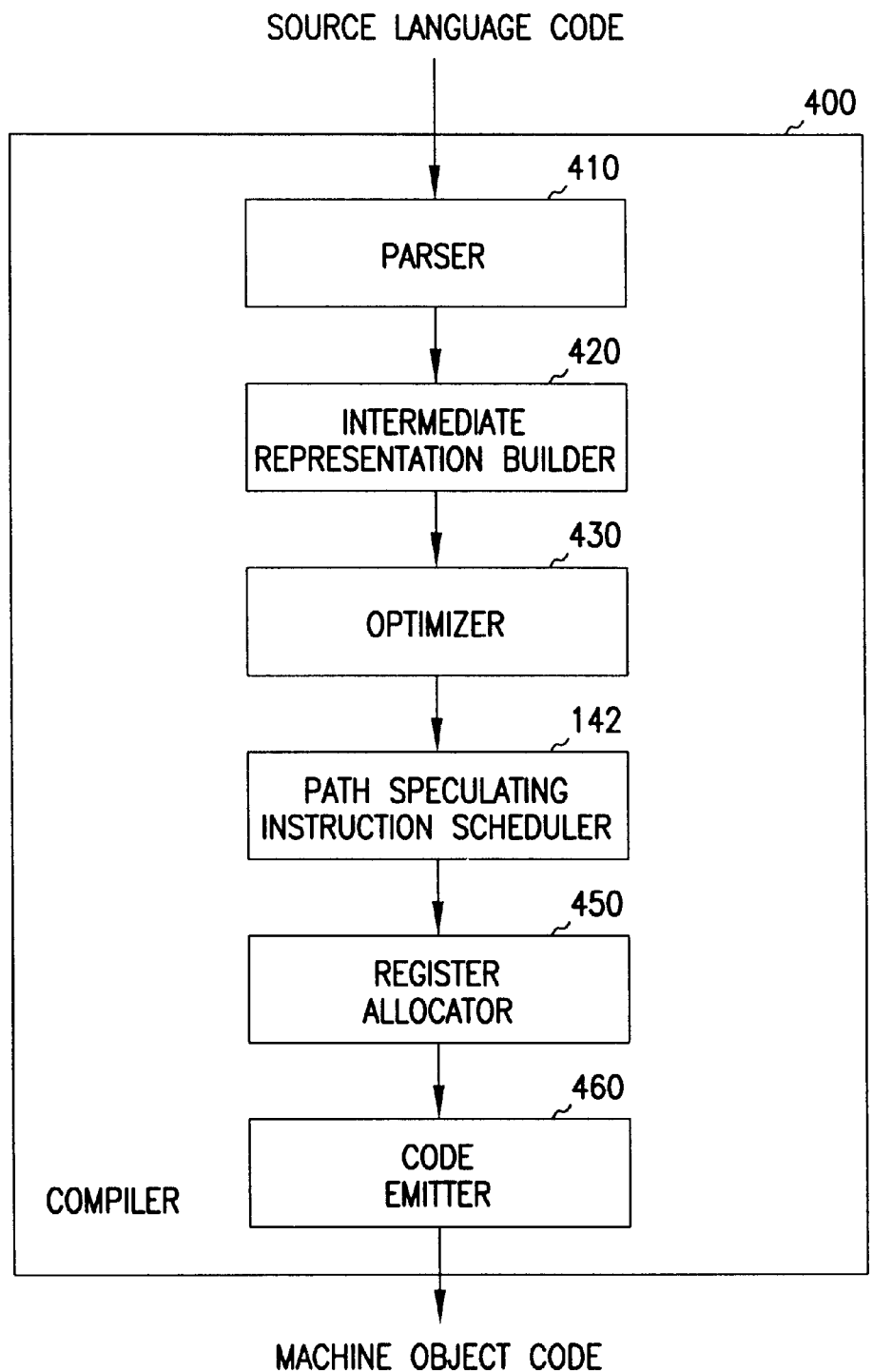
FIG. 4 is a flowchart of a compiler including a path speculating instruction scheduler according to an embodiment of the present invention.

A flowchart 400 of the compiler 330 is shown in FIG. 4 according to an embodiment of the present invention. Source language code for a program is analyzed by a parser 410 and the code is translated into an internal representation of instructions in an intermediate representation builder 420. An optimizer 430 optimizes a sequence of the instructions while maintaining semantics of the instructions, and the path speculating instruction scheduler 142 schedules the instructions for execution in the processor 102. The registers 114 in the processor 102 are allocated to hold operands necessary for the execution of the instructions in a register allocator 450. Finally, a code emitter 460 translates the instructions into machine object code that can be executed by the processor 102, and stores the machine object code in the memory device 106.

Figure 5:
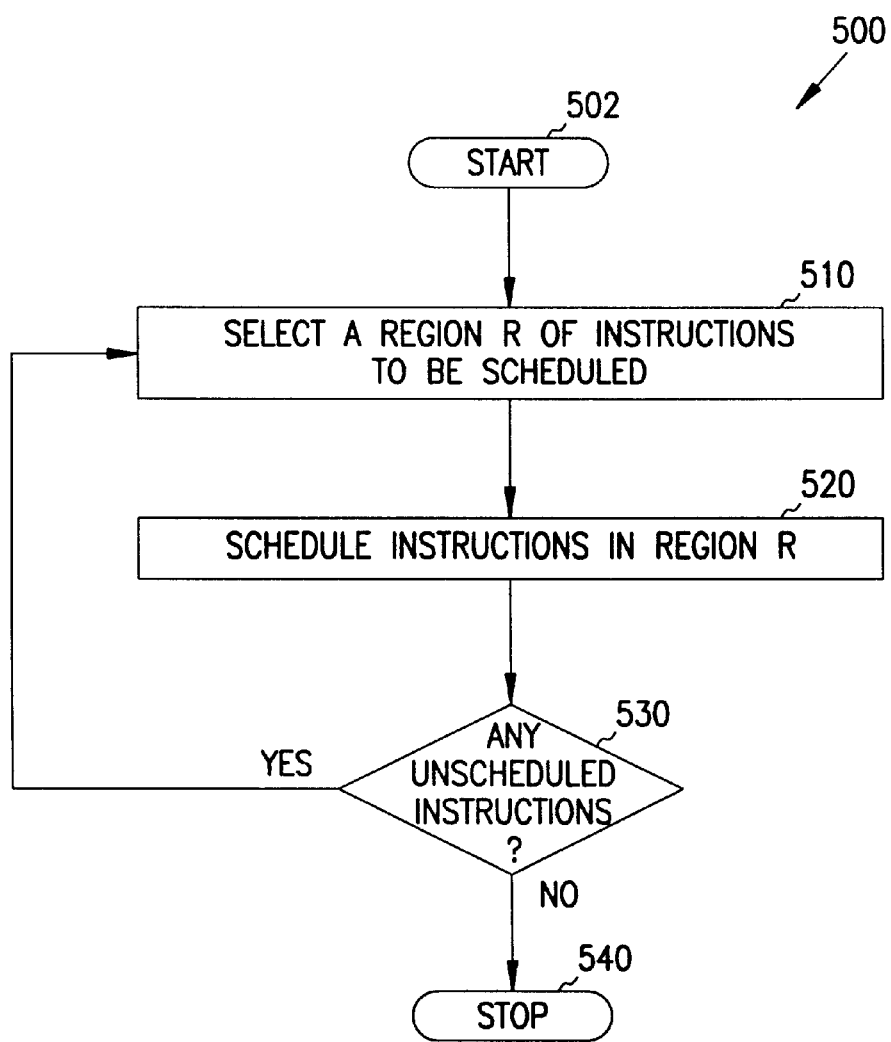
FIG. 5 is a flowchart of a method for dividing instructions into regions for scheduling according to an embodiment of the present invention.

The path speculating instruction scheduler 142 divides the instructions into groups or regions of instructions and schedules the instructions one region at a time. A flowchart of a method 500 for dividing the instructions into regions for scheduling is shown in FIG. 5 according to an embodiment of the present invention. The method 500 begins in 502. A region R of instructions to be scheduled is selected in 510, and the instructions in the region R are scheduled in 520. The instructions in the region R are acyclic. In other words, the instructions in the region R do not include cycles such as loops. Instructions that may complete a loop are left outside the region R. The method 500 determines in 530 whether there are unscheduled instructions remaining and, if so, returns to 510 to select another region R. If no more instructions remain to be scheduled, the method 500 ends in 540.

Figure 6:
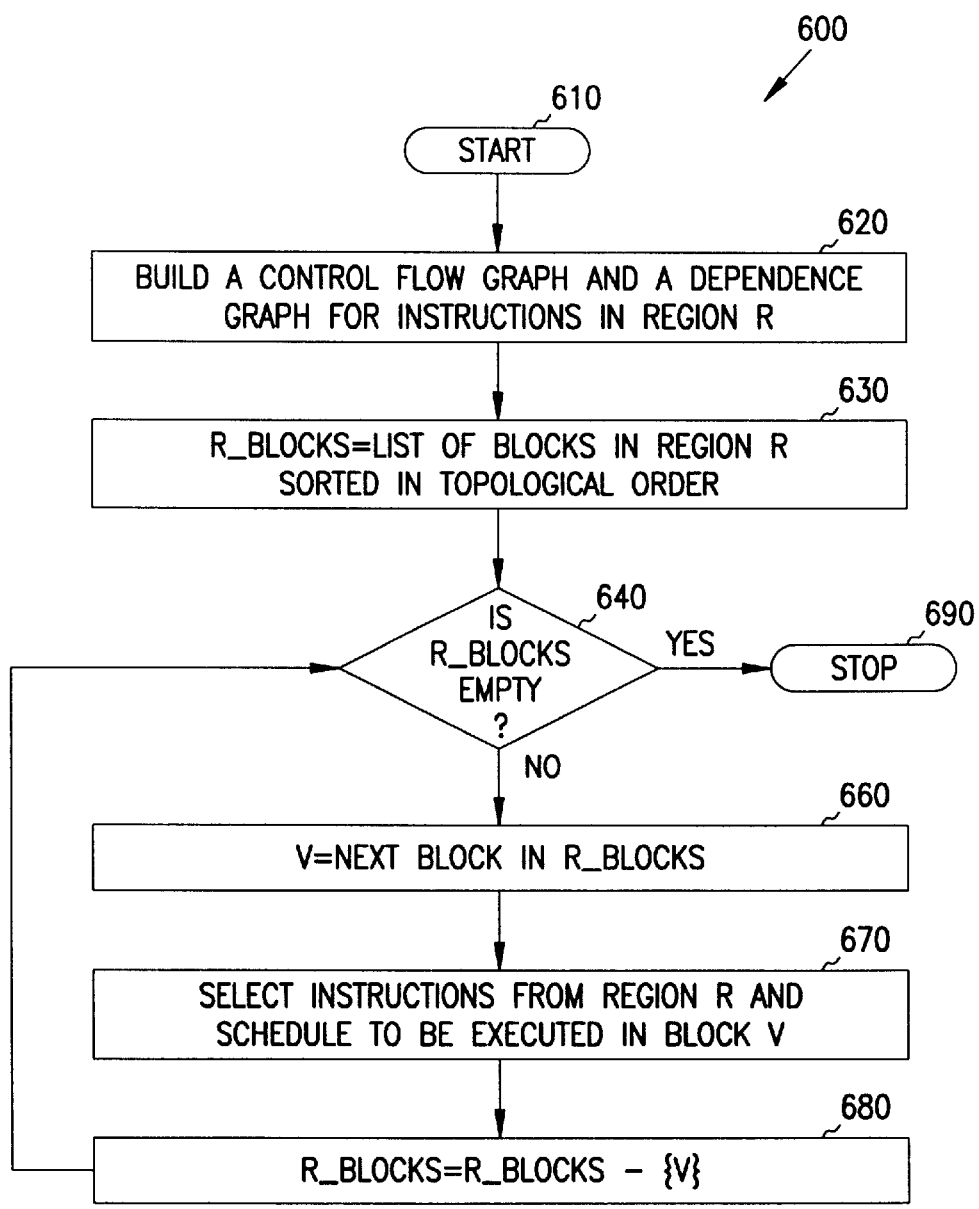
FIG. 6 is a flowchart of a method for scheduling instructions in a region according to an embodiment of the present invention.

The instructions in the region R are scheduled in 520 according to a method 600 shown in a flowchart in FIG. 6 according to an embodiment of the present invention. The method 600 begins in 610. A control flow graph and a dependence graph, both described in more detail below, are built for the instructions in the region R in 620. Briefly, the control flow graph is a representation of the instructions arranged into blocks terminated by branches. The control flow graph represents control flow between the blocks of instructions. Each block contains one or more of the instructions, and the instructions in each block may be executed in the same machine cycle, or in one or more machine cycles. In this description the blocks may also be referred to as nodes in the control flow graph. The instructions in the control flow graph built in 620 are marked as unscheduled, and remain so until they are scheduled for execution.

The blocks in the region R are sorted in a list R_BLOCKS according to a topological order in 630. In a topological order, the first block in the list R_BLOCKS contains the first instructions to be executed by the processor 102. The last block in the list R_BLOCKS contains the last instructions to be executed by the processor 102. The blocks between the first block and the last block in the list R_BLOCKS are also arranged so that instructions executed earlier by the processor 102 are in blocks higher in the list R_BLOCKS.

The remaining portions of the method 600 schedule the instructions into the blocks for execution, and then remove the blocks from the list R_BLOCKS as they are filled with instructions to be executed. In 640 the method 600 determines if there are any blocks remaining in the list R_BLOCKS, and if so the next block in R_BLOCKS is labeled block V in 660. Instructions are selected from the region R and finally scheduled to be executed in block V in 670. In 680 the block V is removed from the list R_BLOCKS, and the method 600 returns to 640 where the list R_BLOCKS is checked again. If all of the blocks have been removed from the list R_BLOCKS then the method ends in 690.

Figure 7:
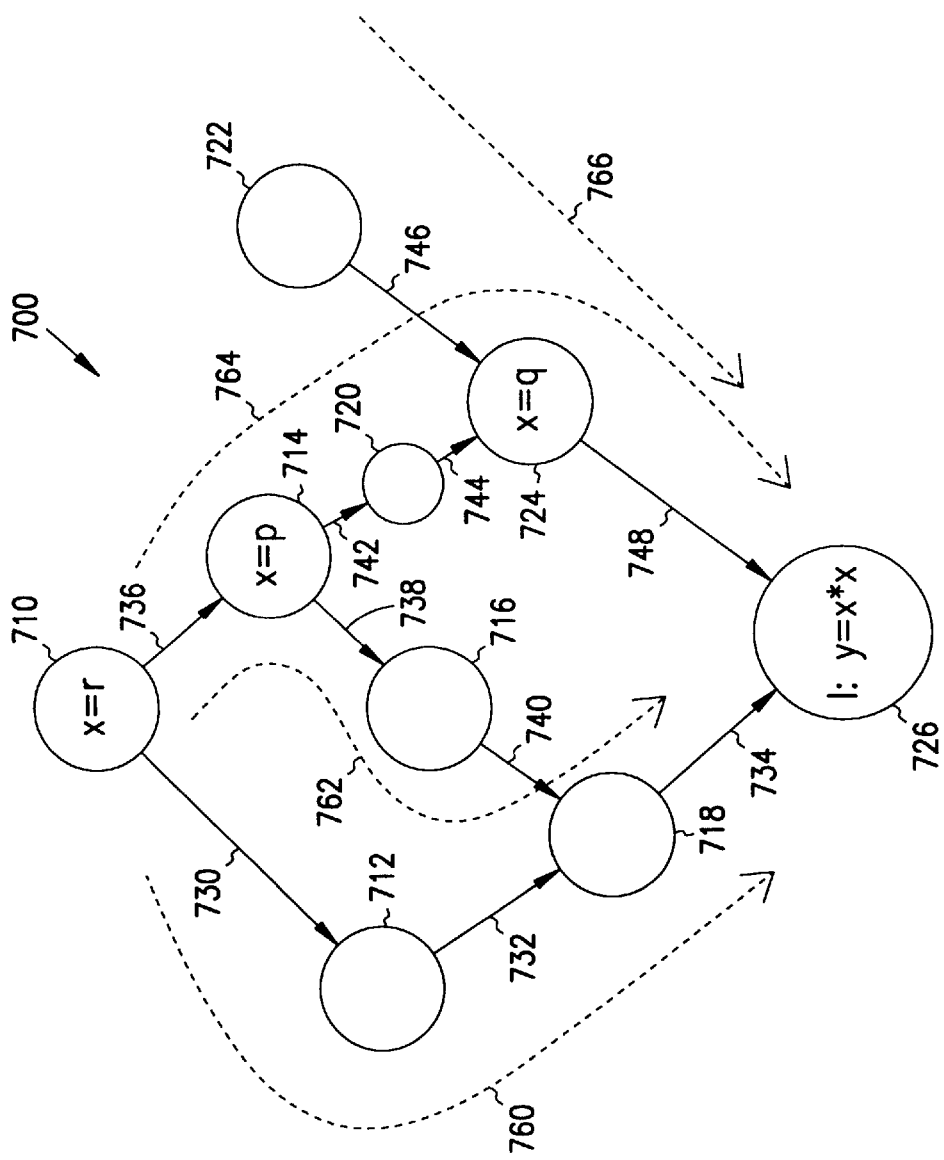
FIG. 7 is an example of a control flow graph according to an embodiment of the present invention.

An example of a control flow graph 700 is shown in FIG. 7 according to an embodiment of the present invention. The control flow graph 700 is a simple example to illustrate the principles of more complex control flow graphs that may be created for the instructions in the region R.

The control flow graph 700 is made up of blocks of instructions 710–726. Each block 710–726 contains one or more instructions that will be executed in an order defined by the control flow graph 700. The instructions in a single block may be executed in the same machine cycle, or may be executed in different machine cycles depending on the available resources in the processor 102 and data dependencies between the instructions. The order of execution of instructions in a block may be arbitrary. The blocks 710–726 are connected by directed edges 730–748 to illustrate a progression of the execution of instructions. The directed edges determine the relationship between predecessor blocks and successor blocks in the control flow graph 700. A successor block is a block having instructions that are executed following the execution of instructions in a predecessor block. A directed edge exits the predecessor block and is directed toward the successor block to illustrate the relationship. An example is the edge 730 that exits the predecessor block 710 and is directed toward the successor block 712. The instructions in the block 712 may be executed only after the instructions in the block 710 are executed. The control flow graph 700 may also be described by a convention wherein instructions scheduled in a selected block are executed before instructions in blocks below the selected block. In other words, the higher an instruction is in the control flow graph 700, the earlier it is executed.

As an example, some of the instructions are shown in blocks in the control flow graph 700. Specifically, an operand x is defined in block 710, then redefined in blocks 714 and 724. An instruction I is located in block 726 in which an operand y is made equal to the operand x squared. This example will be used to illustrate an embodiment of the present invention hereinbelow.

Some of the blocks 710–726 are split blocks that have two or more successor blocks and two or more corresponding directed edges exiting therefrom. An example of a split block is the block 710 having the edges 730, 736 exiting therefrom. A branch instruction is executed in the block 710, the results of which determine whether the instructions in the block 712 or the instructions in the block 714 are executed.

Some of the blocks 710–726 are join blocks that have multiple predecessor blocks and receive two or more directed edges. An example of a join block is the block 718 that receives both the edges 732 and 740. The instructions in the join block 718 may be executed after the instructions in either of the blocks 712 or 716 are executed.

A JS edge is defined as a directed edge that exits from a split block and is received by a join block. In control flow graphs built according to embodiments of the present invention all JS edges are eliminated by adding a JS block along each JS edge. The blocks 716 and 720 in FIG. 7 are JS blocks because they separate a split block from a join block along what would otherwise be a JS edge. JS blocks are added to a control flow graph for reasons that will be described hereinbelow.

The execution of branch instructions in the split blocks determines the sequence of instructions that are executed. Each unique sequence of instructions is represented by a path in a control flow graph. For example, four paths 760–766 are shown in FIG. 7 to illustrate each sequence of instructions that may be executed through the control flow graph 700. Each time the program is run a different sequence of instructions along a different path may be executed depending on inputs to the program. The path speculating instruction scheduler 142 schedules instructions based on vectors or sets of paths in a control flow graph as will be described below according to embodiments of the present invention.

Figure 8:
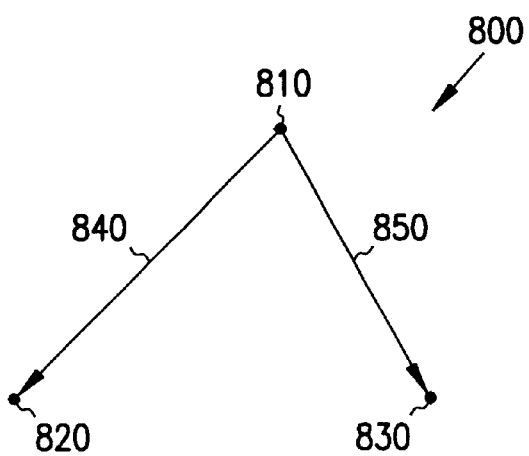
FIG. 8 is an example of a dependence graph according to an embodiment of the present invention.

A control flow graph shows the order in which the processor 102 executes instructions, but does not contain information about precedence constraints. Precedence constraints define the legality of the order of the execution of the instructions. In other words, precedence constraints identify which instructions must be executed prior to the execution of other instructions. Precedence constraints are represented by a dependence graph, and an example of a dependence graph 800 is shown in FIG. 8 according to an embodiment of the present invention. The dependence graph 800 includes nodes 810, 820, and 830, each representing a single instruction. Directed edges 840 and 850 connect the nodes 810, 820, and 830 and define precedence constraints. The dependence graph 800 indicates that the instruction 810 must be executed before either of the instructions 820, 830, because the execution of both instructions 820 and 830 depends on a result of the execution of the instruction 810. The instruction 810 is called a data predecessor of the instructions 820, 830. Likewise, the instructions 820, 830 are called data successors of the instruction 810. The instruction 820 may be executed either before or after the instruction 830, and is not constrained thereby. A dependence graph is generated from the instructions in a control flow graph, and is a constraint on the scheduling of instructions described below.

As stated above with reference to FIG. 6, instructions are selected from a region R of instructions and finally scheduled for execution in a machine cycle of a target block in a control flow graph in 670. Methods for carrying out this portion of the path speculating instruction scheduler 142 will now be described according to an embodiment of the present invention. The path speculating instruction scheduler 142 will be described with the aid of the following example. The control flow graph 700 shown in FIG. 7 will represent a region R of instructions to be scheduled for execution, and the instruction I originally located in block 726 at the bottom of the control flow graph 700 will be scheduled for execution in one of the blocks 710–726. The path speculating instruction scheduler 142 seeks to move instructions up the control flow graph 700 so that they may be executed in parallel with other instructions to reduce the overall program execution time. However, when an instruction, such as the instruction I, is moved up the control flow graph 700 care must be taken to ensure that each data predecessor of I is scheduled to be executed before the result of the execution of I is determined. For example, if I were to be moved from the block 726 to the block 710, called a target block 710, then it would be executed sooner. The target block 710 is so named because it is the target toward which the movement of I is directed. However, if instructions are executed on either of the paths 762 or 764, then the result of the execution of I in the target block 710 will be incorrect because of the redefinition of the operand x in the blocks 714 and 724. Therefore, if the path speculating instruction scheduler 142 moves I to the target block 710 then it must place copies of I, called path speculation compensation copies, into other blocks in the control flow graph 700 such that, if one of the paths 762 or 764 is traversed, the result of the execution of I will be correct. In this example path speculation compensation copies may be placed in the blocks 716 and 724, or in another set of blocks as will be described hereinbelow.

The movement of the instruction I is determined in part by a decision whether to maintain or break a single-copy-on-a-path (SCP) property of the instruction which will now be described. SCP holds for an instruction if the instruction is executed only once on a path in a control flow graph on which it is located. SCP is valuable because of the inherent waste of time and processor resources when an instruction is executed more than once on the same path. The path speculating instruction scheduler 142 seeks to maintain SCP for scheduled instructions to avoid the possibility that an instruction will be executed more than once on the same path. However, when an instruction is moved up the control flow graph and path speculation compensation copies are added SCP may be broken for the instruction on some paths in the control flow graph. For example, if I is moved from block 726 to the target block 710 and path speculation compensation copies are placed in blocks 716 and 724, then SCP will be broken for I on the paths 762 and 764. SCP will be maintained for the instruction I on the path 760 after the movement. If the paths 762 or 764 are taken then I will be executed more than once thereby potentially reducing the instruction execution performance. The path speculating instruction scheduler 142 seeks to balance the benefit of moving an instruction up a control flow graph with the potential cost to the instruction execution performance of breaking SCP with the movement. The decision of whether to maintain SCP for an instruction is made when the instruction is selected to be scheduled for execution in a target block, as is described below.

Instructions to be scheduled are classified by the path speculating instruction scheduler 142 in order to aid in the decision of whether to break SCP for a particular instruction. The classifications will now be described. An instruction is "ready" on a particular path on which it remains to be scheduled if it has no unscheduled data predecessors on that path. Likewise, an instruction is "not ready" on a particular path on which it remains to be scheduled if it has an unscheduled data predecessor on that path. For each target block, an instruction is classified according to three types of "readiness" depending on its location in the control flow graph and its data predecessors. An instruction has "M-readiness" at a target block if it has no unscheduled data predecessors on any path on which the instruction remains to be scheduled that pass through the target block. An instruction has "P-readiness" at a target block if it does not have M-readiness and if there is at least one path passing through the target block on which the instruction remains to be scheduled on which there are no unscheduled data predecessors for the instruction. A movement of the P-ready instruction will therefore break SCP and require the addition of path speculation compensation copies in the control flow graph. An instruction is "not-ready" if all the paths passing through the target block on which the instruction remains to be scheduled have at least one unscheduled data predecessor.

Figure 9:
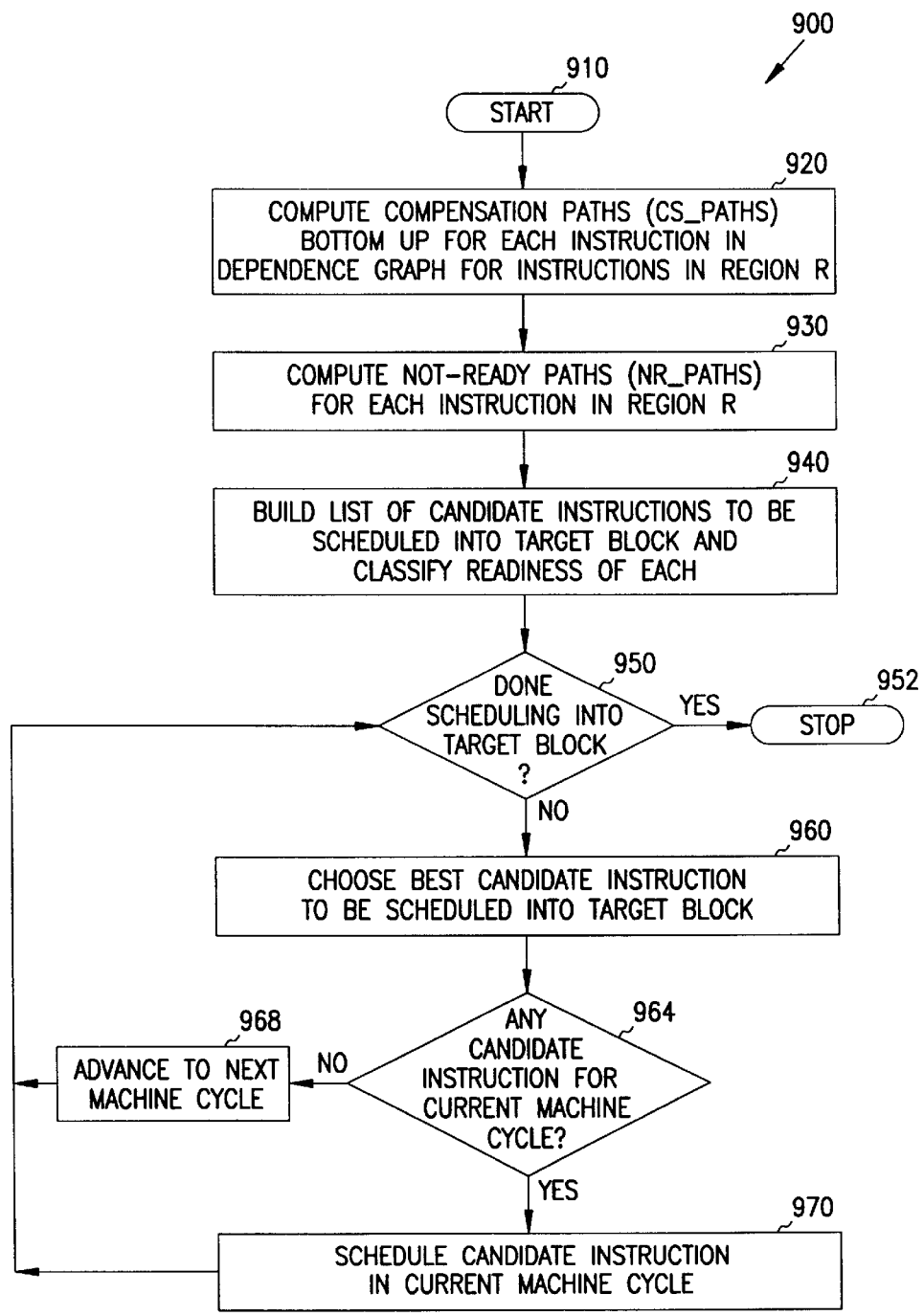
FIG. 9 is a flowchart of a method for scheduling instructions to be executed in a block in a control flow graph according to an embodiment of the present invention.

A flow chart of a method 900 of scheduling instructions to be executed in a target block in a control flow graph is shown in FIG. 9 according to an embodiment of the present invention. The control flow graph and a dependence graph for the instructions in the region R were built in 620 of the method 600 described above. The method 900 begins in 910. In 920 a set of compensation paths, called CS_PATHS, is computed bottom up for each instruction in the dependence graph for the instructions in the region R. The CS_PATHS are computed first for the bottom-most instructions in the dependence graph, and then for preceding instructions up the dependence graph. Therefore, when the CS_PATHS are computed for an instruction, the CS_PATHS for all the instructions below that instruction have already been computed. CS_PATHS includes all of the paths in the control flow graph on which the instruction produces a useful value. CS_PATHS is the set of all paths on which the instruction remains to be scheduled. In 930 a set of not-ready paths, called NR_PATHS, is computed for each instruction in the region R. NR_PATHS includes all of the paths in the control flow graph on which there is an unscheduled data predecessor for the instruction. The computation of the sets CS_PATHS and NR_PATHS will be described in more detail with reference to FIGS. 10 and 11.

A list of instructions that are candidates for scheduling into the target block is built in 940, and a readiness of each of the candidate instructions is classified according to the classifications described above. The method 900 determines in 950 whether there are any more instructions in the region R to be scheduled into the target block and, if there are no more instructions, the method ends in 952.

The instruction that is the best candidate to be scheduled into the target block is chosen in 960 according to several factors that will now be described according to an embodiment of the present invention. In choosing the best candidate instruction, the path speculating instruction scheduler 142 is speculating that the instruction execution performance will be improved by the movement to the target block based on the analysis of the following factors.

One factor is resource availability. Each instruction consumes computational resources in the processor and requires one or more machine cycles to be executed.

Another factor in the selection is a critical path length of an instruction, which is the number of machine cycles needed to execute the instruction and its data successors and their data successors until the end of the region R is reached. The longer the critical path length of an instruction is, the longer it will take the processor to complete the program after the instruction has been executed. Therefore, the execution of the entire program will be completed sooner if the instructions having longer critical path lengths are executed earlier than the instructions with the shorter critical path lengths. The longer the critical path length of an instruction is, the better a candidate it is for scheduling.

Another factor in the selection is path probability. Path probability is the probability that the sequence of instructions actually executed will follow a certain path. The sequence of instructions executed is also referred to as the control flow of a program through the control flow graph. There is a finite probability that each path in the control flow graph will be traversed as the program is executed. Some paths are more likely to be traversed than others. Path probability may be determined by compiling and executing the program repeatedly with test inputs and additional instructions to monitor the control flow as is known to those skilled in the art.

Another factor is the readiness classification of an instruction described above. If an instruction is M-ready in a target block then SCP will not be broken if the instruction is moved to the target block. No path speculation compensation copies will be necessary and there is no risk that the instruction will be executed more than once if moved to the target block. Therefore the execution performance for the program will be improved if the instruction is moved to the target block. However, if the instruction is P-ready in the target block then a movement to the target block will require the insertion of path speculation compensation copies in the control flow graph and the consequent risk that the instruction will be executed more than once along one of the paths passing through the target block. The path probability factor described above is considered in conjunction with readiness to determine if the path on which the instruction is ready is the most probable one to be traversed by the control flow, and, if so, then a balance of the factors may indicate the desirability of moving the P-ready instruction to the target block and breaking SCP for that instruction. The balance of factors may, in the alternative, indicate that the cost of breaking SCP outweighs the benefit conferred by the movement.

Other factors that may be considered in choosing the best candidate instruction to be scheduled are described in Krishnamurthy, *A Brief Survey of Papers on Scheduling for Pipelined Processors*, 25 (7) Sigplan Notices 97 (1990) and Smotherman et al., *Efficient DAG Construction and Heuristic Calculation for Instruction Scheduling*, Proceedings of the 24th Annual International Symposium on Microarchitecture 93 (1991).

In 964, the method 900 determines whether there is a candidate instruction that may be scheduled into the target block in a current machine cycle. There may be no more instructions in the region R that can be scheduled into the target block in the current machine cycle. If it is determined in 964 that there are no more instructions that may be scheduled into the target block in the current machine cycle, the method 900 advances to schedule instructions into the target block in the next machine cycle in 968 and returns to 950 to determine whether there are any more instructions in the region R to be scheduled into the target block. If there is an instruction that may be scheduled in the current machine cycle then it is scheduled in 970 and the method 900 returns to 950. The scheduling in 970 is described in more detail below with reference to FIG. 12.

Figure 10:
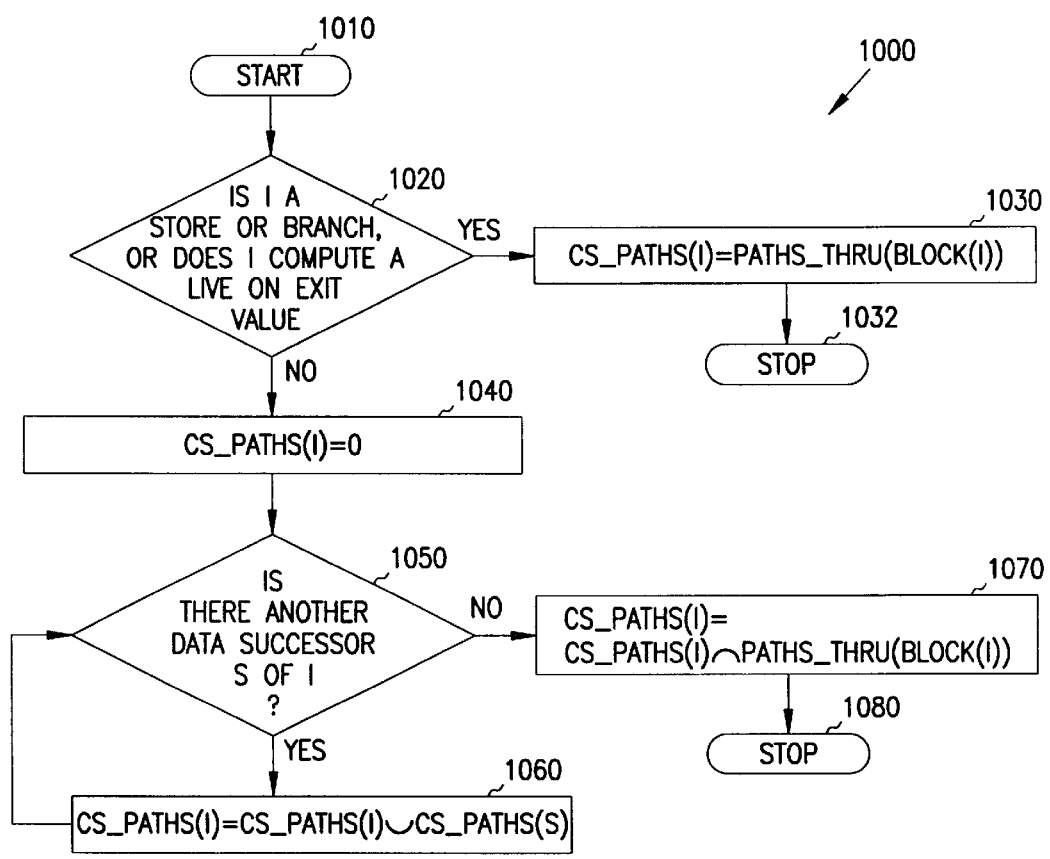
FIG. 10 is a flowchart of a method for computing a set of compensation Oaths for an instruction according to an embodiment of the present invention.

The set of compensation paths CS_PATHS computed for an instruction in 920 of the method 900 may be computed by a method 1000 according to an embodiment of the present invention. A flowchart of the method 1000 is shown in FIG. 10. In the method 1000 a set of compensation paths CS_PATHS(I) is computed for an instruction I that is originally located in a block labeled BLOCK(I) in a control flow graph. A variable labeled PATHS_THRU(BLOCK(I)) is defined as a set of paths that pass through the BLOCK(I). Also, a data successor of I is called an instruction S, and it is assumed that all compensation paths of each instruction S, labeled CS_PATHS(S), have been computed previously. As described above, a compensation path for an instruction is a path in the control flow graph on which the instruction produces a value that is used by other instructions. The method 1000 begins in 1010 and in 1020 determines whether I is a store or a branch instruction, or if I computes a "live on exit" value. A "live on exit" value is a value that is used by instructions outside the region R. If I falls into one of these categories then CS_PATHS(I) is defined to include all of the paths through BLOCK(I), PATHS_THRU (BLOCK(I)), in 1030, and the method 1000 ends in 1032.

If I is not in one of the categories listed in 1020 then CS_PATHS(I) is defined as a null set in 1040. The method 1000 searches for a data successor S of I in 1050 and, if found, CS_PATHS(I) is defined as a union of itself and the compensation paths of the data successor S, CS_PATHS(S) in 1060. The method 1000 returns to 1050 to search for another data successor S, and repeats 1060 for each data successor S found. If no further data successor S exists, the set CS_PATHS(I) is limited to an intersection with the set PATHS_THRU(BLOCK(I)) in 1070, and the method 1000 ends in 1080. As a result, the set of compensation paths CS_PATHS for I is limited to the compensation paths of all the data successors S, CS_PATHS(S), passing through the BLOCK(I) if it does not fall into one of the categories in 1020. As mentioned above, the set of compensation paths CS_PATHS for I includes all of the paths in the control flow graph on which I needs to be scheduled.

Figure 11:
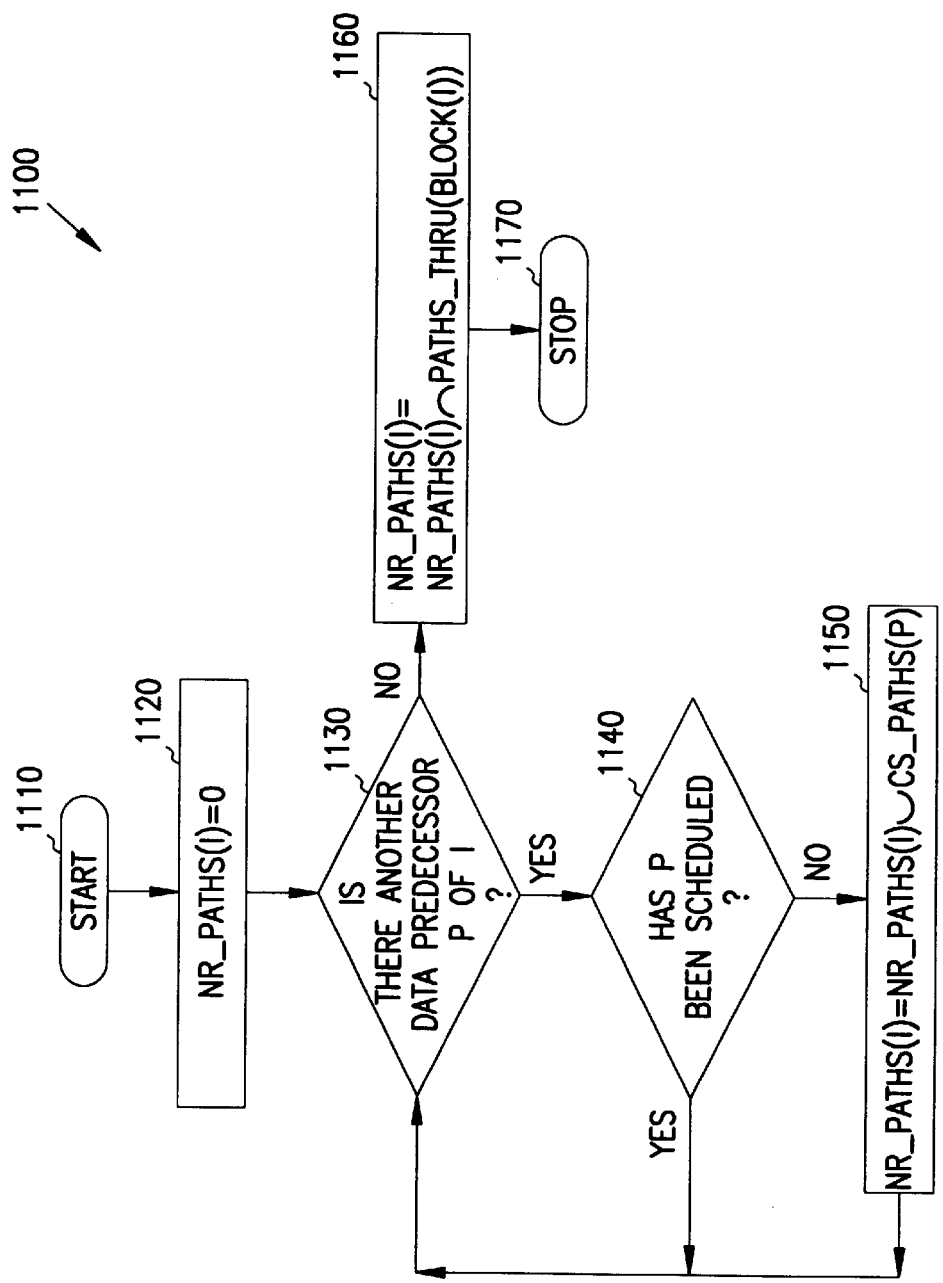
FIG. 11 is a flowchart of a method for computing a set of not-ready paths for an instruction according to an embodiment of the present invention.

The set of not-ready paths NR_PATHS computed for an instruction in 930 of the method 900 may be computed by a method 1100 according to an embodiment of the present invention. A flowchart of the method 1100 is shown in FIG. 11. In the method 1100 the set of not-ready paths NR_PATHS(I) is computed for an instruction I that is originally located in a block labeled BLOCK(I). As defined above, a variable labeled PATHS_THRU(BLOCK(I)) is defined as a set of paths that pass through the BLOCK(I). Also, a data predecessor of I is called an instruction P, and it is assumed that the compensation paths of all data predecessors, CS_PATHS(P), have been computed previously.

The method begins in 1110 and in 1120 makes the set NR_PATHS(I) a null set. The method 1100 searches for a data predecessor P of I in 1130 and, if found, determines if P has been scheduled in 1140. If P has been scheduled then it cannot contribute to a not-ready path of I, and the method 1100 returns to 1130 to search for another data predecessor P. If P has not been scheduled then NR_PATHS(I) is defined as a union of itself and the compensation paths of P, CS_PATHS(P), in 1150. If all the data predecessors P for I have been found in 1130 then the set NR_PATHS(L) is limited to an intersection with the set PATHS_THRU (BLOCK(I)) in 1160, and the method 1100 ends in 1170. As a result, the set of not-ready paths NR_PATHS(I) includes all of the paths in the control flow graph on which there is an unscheduled data predecessor P for I and which pass through the BLOCK(I).

Figure 12:
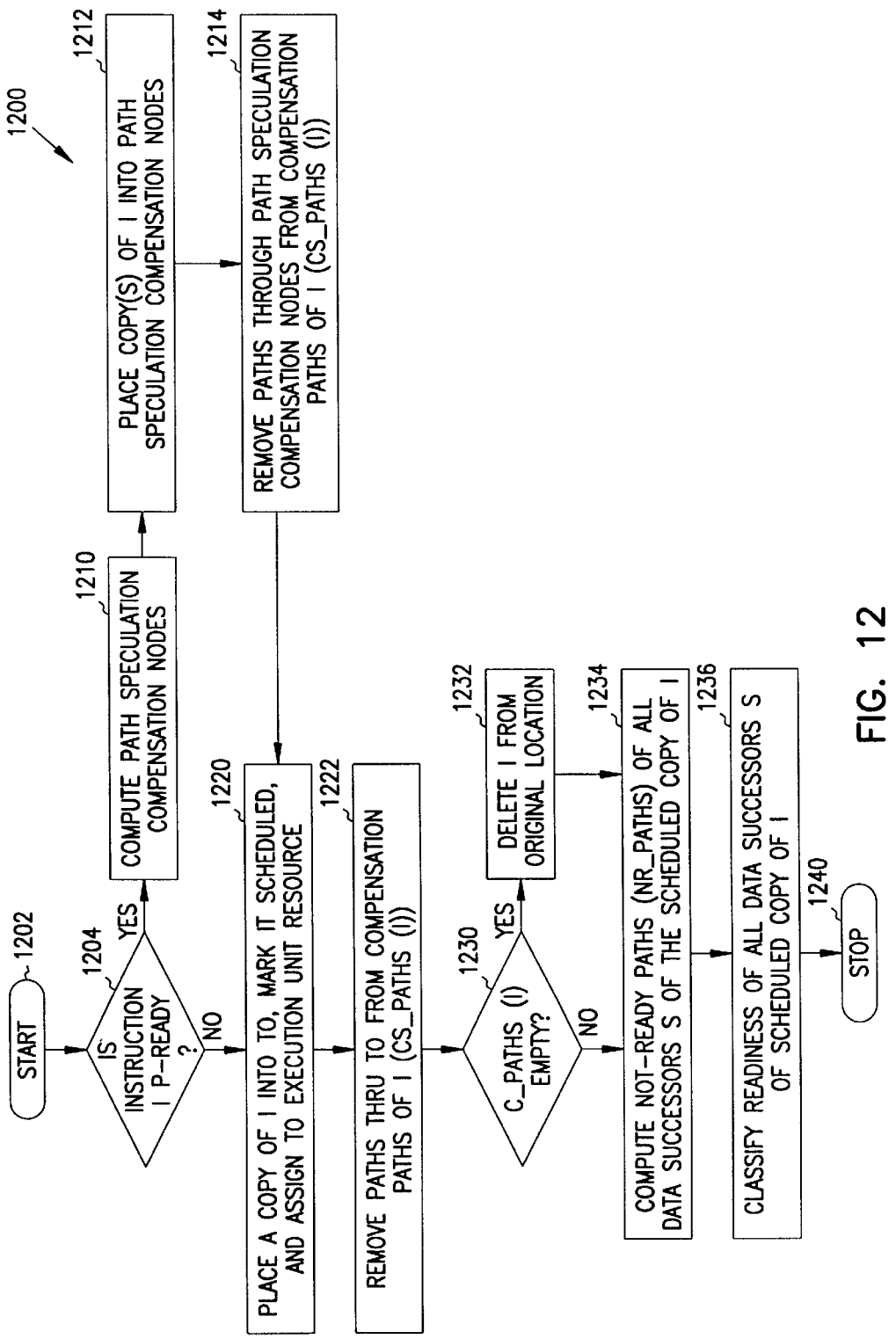
FIG. 12 is a flowchart of a method for scheduling an instruction into a block according to an embodiment of the present invention.

As described above, if there is an instruction that is chosen to be scheduled in the current machine cycle the instruction is scheduled in 970 of the method 900. A flowchart of method 1200 for scheduling an instruction I into a block TO in a control flow graph of a region R in a current machine cycle is shown in FIG. 12 according to an embodiment of the present invention. The method 1200 begins in 1202 and in 1204 determines if I is P-ready. If I is P-ready then path speculation compensation nodes are computed for I in 1210. The path speculation compensation nodes are blocks in the control flow graph into which path speculation compensation copies of I are placed. The computation of the path speculation compensation nodes is more fully described hereinbelow with reference to FIGS. 13A and 13B. Copies of I are placed in the path speculation compensation nodes in 1212, and all paths passing through the path speculation compensation nodes are removed from the list of compensation paths of I, or CS_PATHS(I). This is done because once the path speculation compensation copies of I have been placed in the compensation nodes I does not need to be scheduled on the paths passing through those compensation nodes anymore.

A copy of I is then placed in the block TO, marked as scheduled, and assigned to an execution unit resource in 1220. This is the point in the method 1200 where I is moved up the control flow graph. This movement occurs directly after 1204 if I is M-ready, and no path speculation compensation copies need to be placed in the control flow graph. Next, all paths passing through the block TO are removed from CS_PATHS(I) in 1222. This is done because once a copy of I is scheduled in the block TO, I does not need to be scheduled on the paths passing through the block TO anymore. The method 1200 determines in 1230 if CS_PATHS(I) is now empty, and if it is empty, then I is deleted from the block of its original location in 1232 because there are no remaining paths in the control flow graph on which that copy of I must deliver a useful value. If there are paths remaining in CS_PATHS(I) then I is left in the block of its original location to ensure that I is scheduled on those remaining compensation paths.

Once I is scheduled for execution in TO then the readiness of all data successors S of I could change. A new set of not-ready paths (NR_PATHS) for all data successors S of I is computed in 1234, and the readiness of all of the data successors S of I is classified in 1236. The method 1200 ends in 1240.

Figure 13A:
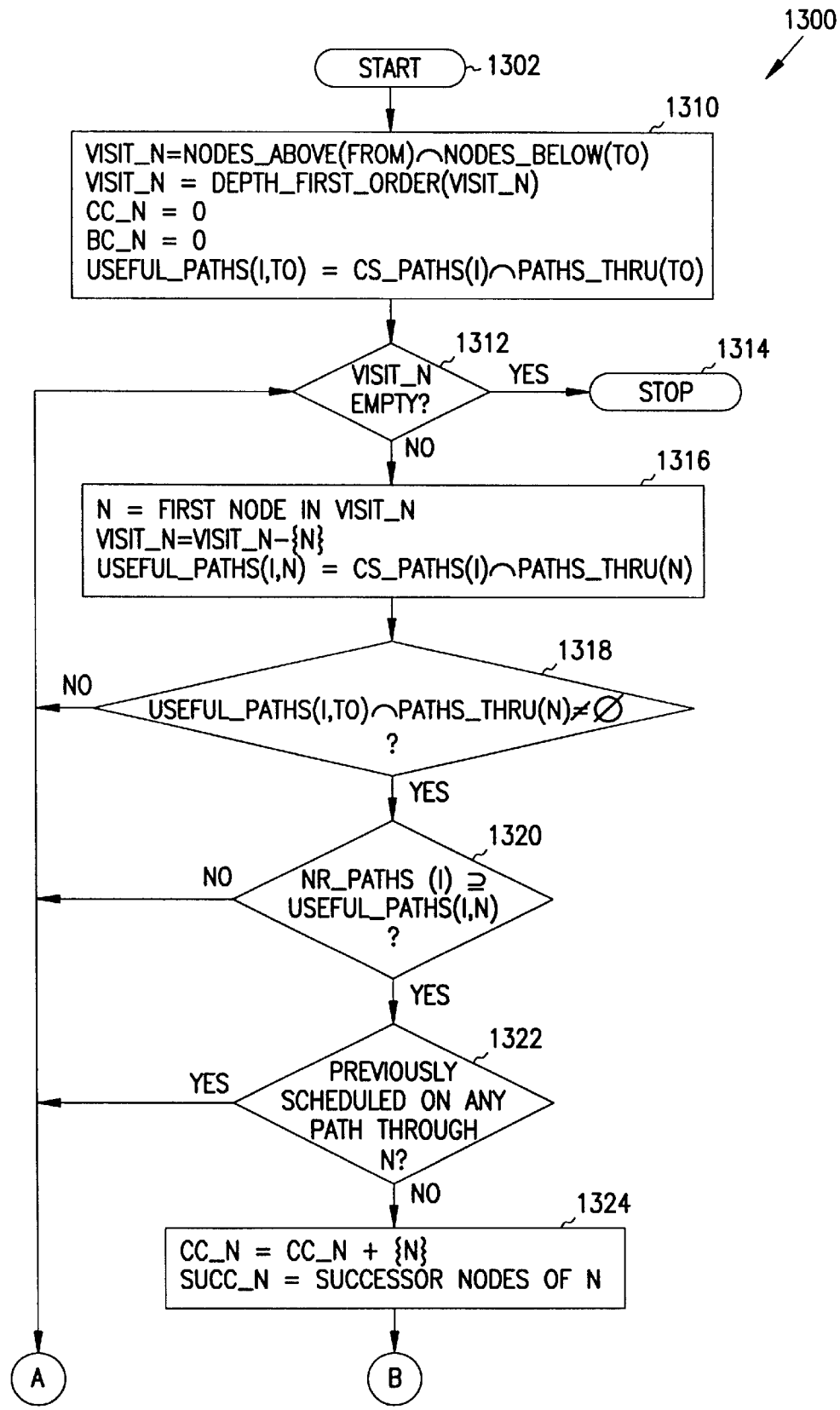
FIGS. 13A and 13B are a flowchart of a method for computing path speculation compensation nodes according to an embodiment of the present invention.
Figure 13B:
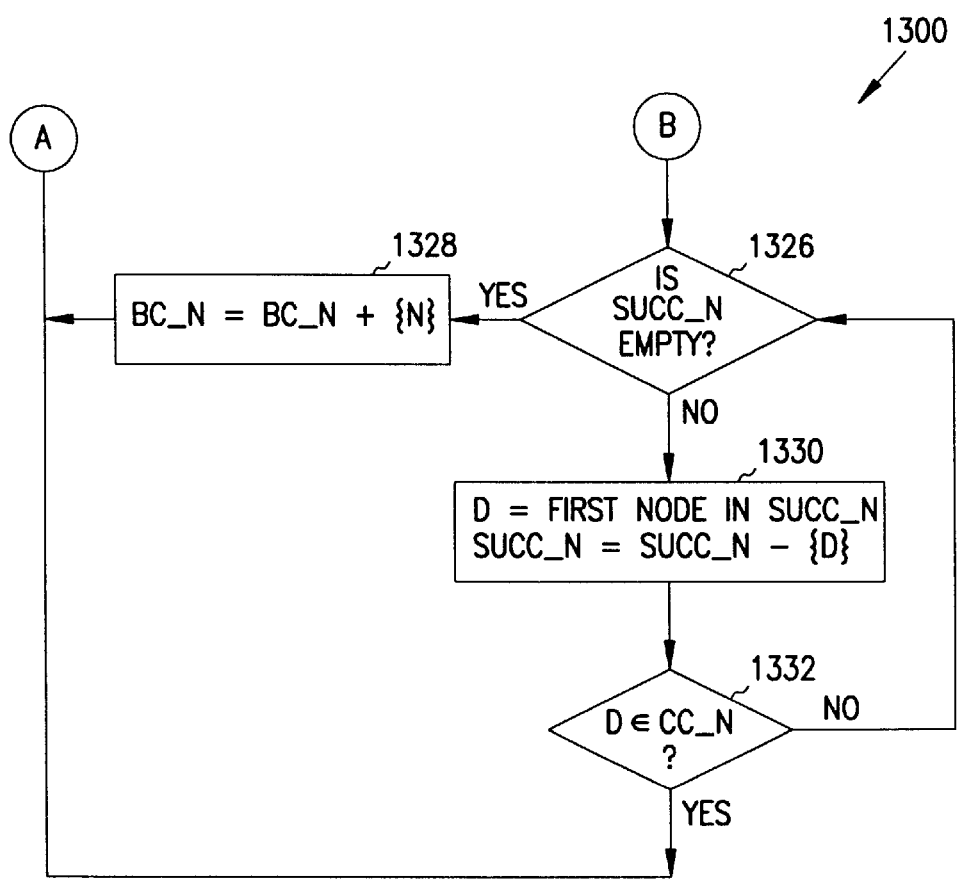

A flowchart of a method 1300 for computing the path speculation compensation nodes in 1210 of the method 1200 is shown in FIGS. 13A and 13B. In the method 1300 blocks in the control flow graph will be referred to as nodes. The node in the control flow graph that is the original location of I is labeled node "FROM," and I is moved to a node TO. The method begins in 1302 and in 1310 several variables are defined. A list VISIT_N is created including all the nodes in the control flow graph between FROM and TO, and is defined as an intersection between all the nodes above FROM, or NODES_ABOVE(FROM), and all the nodes below TO, or NODES_BELOW(TO). The resulting list Visit_N is rearranged by a function DEPTH_FIRST_ORDER(VISIT_N) such that the deepest nodes in the list Visit_N are addressed first in the method 1300. The, depth of a node is determined by the number of edges that must be traversed from any entry of the control flow graph to reach the node. If a node may be reached by two or more paths, the depth of the node is the maximum number of edges that may be traversed to reach the node. As an example, in the control flow graph 700 shown in FIG. 7, the node 724 is three edges deep and the node 712 is a single edge deep.

Other variables are also initialized in 1310. A list CC_N of nodes that are candidates to receive a path speculation compensation copy and a list BC_N of the path speculation compensation nodes that are the lowest nodes in the list CC_N are created in 1310. The path speculation compensation nodes in the list BC_N are the nodes that receive a path speculation compensation copy in 1212 of the method 1200 shown in FIG. 12. Finally, a set of paths passing through the node TO on which it is useful to have a result generated by I is created and identified as USEFUL_PATHS (I,TO). The list USEFUL_PATHS(I,TO) is defined as an intersection of the compensation paths of I, CS_PATHS(I), and the paths passing through the node TO, PATHS_THRU (TO).

The method 1300 then visits each node in the list VISIT_N to determine if a path speculation compensation copy may be placed in the node, and then removes the node from the list VISIT_N until VISIT_N is empty. Initially, the method 1300 determines in 1312 if the list VISIT_N is empty, and if so the method ends in 1314. If VISIT_N is not empty, a first node in the list VISIT_N is defined as node N in 1316, and the node N is removed from the list VISIT_N. Before its removal the node N was the deepest node in the list VISIT_N due to the rearrangement by the function DEPTH_FIRST_ORDER(VISIT_N). A set of paths passing through the node N on which it is useful to have a result generated by I is created and identified as USEFUL_PATHS (I,N). The list USEFUL_PATHS(I,N) is defined as an intersection of the compensation paths of I, CS_PATHS(I), and the paths passing through the node N, PATHS_THRU (N).

The method 1300 then tests three conditions for placing a path speculation compensation copy in the node N. First, in 1318, the method 1300 determines if at least one of the useful paths passing through the node TO also passes through the node N. This is true if the intersection of USEFUL_PATHS(I,TO) and PATHS_THRU(N) is not a null set. If this intersection is a null set then the method 1300 returns to 1312 and no path speculation compensation copy will be placed in the node N because of the movement of I to TO because none of the paths passing through N have a use for the result generated by the instruction I moved to TO.

If the intersection of USEFUL_PATHS(I,TO) and PATHS_THRU(N) contains at least one path the method 1300 then determines if the useful paths passing through N, USEFUL_PATHS(I,N), is a subset of the not-ready paths of I, NR_PATHS(I) in 1320. This condition is imposed because a path speculation compensation copy of I is to be placed only on a node for which I is not ready on all the paths passing through the node. If I was ready along one of the paths passing through node N, meaning that there were no unscheduled data predecessors of I on that path, and a path speculation compensation copy of I is placed into node N, then I would be executed more than once on that ready path, breaking SCP and defeating the advantage of moving the instruction I up the control flow graph. Path speculation compensation copies are therefore placed only in nodes where I has unscheduled data predecessors on all the paths. With the addition of JS blocks to the control flow graph there are enough nodes such that there is no need to place a path speculation compensation copy of I on a ready path.

If the set USEFUL_PATHS(I,N) is a subset of the set NR_PATHS(I), then the method 1300 determines if I has been previously scheduled on any path through N in 1322. If I has been scheduled on a path passing through N then the method 1300 returns to 1312, and no path speculation compensation copy will be placed in N. This is done to avoid breaking SCP on that path that already has a scheduled copy of I. However, if I has not been previously scheduled on at least one path through N then all three conditions have been met and the node N is chosen as a candidate to receive a path speculation compensation copy of I.

The node N is added to the list CC_N in 1324 and a list of successor nodes of N is created, called SUCC_N, including all of the nodes succeeding N in the control flow graph. The method 1300 uses the list SUCC_N to make sure that only the lowest nodes in the list CC_N actually receive path speculation compensation copies. Only the nodes in BC_N actually receive a path speculation compensation copy of I to ensure that each path speculation compensation copy lies on a distinct set of paths. The method 1300 determines if the list SUCC_N is empty in 1326, and if so this means that N has no successor nodes and N is added to the list BC_N in 1328, and the method 1300 returns to 1312. If the list SUCC_N is not empty then nodes are progressively removed from SUCC_N in 1330 until a node is identified in 1332 as being in the list CC_N. If this is the case then a successor S of N is also a candidate to receive a path speculation compensation copy of I and N is not added to BC_N, and will not receive a path speculation compensation copy. If none of the successors of N is in CC_N, then N is added to the list BC_N in 1328, and the method 1300 then returns to 1312.

The path speculating instruction scheduler described herein according to embodiments of the present invention includes many advantages and features not found in conventional instruction scheduling methods. For example, the path speculating instruction scheduler defers the decision of whether to maintain the SCP property with respect to a particular instruction in a multiple path region until the instruction is scheduled for execution in the region. The decision to maintain SCP is decided dynamically on a per instruction basis by candidate selection heuristics. The path speculating instruction scheduler incorporates path probability, critical path length, and resource availability in deciding whether to maintain SCP. The path speculating instruction scheduler divides candidate instructions into three classes based on their readiness, and then presents the candidate instructions to candidate selection heuristics. Then the decision is made to maintain SCP or to schedule a selected candidate instruction path speculatively.

The software and methods shown in FIGS. 3 to 13A and 13B and described above comprise the path speculating instruction scheduler 142 that is made up of computer-readable instructions implemented in the computer-readable medium 140 shown in FIG. 1. The instructions are computer-executable by the processor 102 shown in FIG. 1. The computer-readable medium may include software modules and computer programs. The computer programs may comprise multiple modules or objects to perform the methods, or the functions of the methods. The type of computer programming languages used to write the code may vary from procedural code type languages to object oriented languages. Resulting files or objects need not have a one to one correspondence with the modules or method acts described depending on the desires of a programmer. Further, the software and methods may be implemented in combinations of software, hardware and firmware as is well known to those skilled in the art. The description of the methods with reference to flowcharts enables one skilled in the art with the benefit of the present description to develop programs including instructions to carry out the methods on suitable computerized systems.

Those skilled in the art having the benefit of this description can appreciate that the present invention may be practiced with any information-handling system including a processor. Such information-handling systems may include, for example, a video game, a hand-held calculator, a television set-top box, a fixed-screen telephone, a smart mobile phone, a personal digital assistant (PDA), a network computer (NC), a hand-held computer, a personal computer, or a multiprocessor supercomputer, or an information appliance such as, for example, a cellular telephone or other wireless device, a pager, or a daily planner or organizer, or an information component such as, for example, a magnetic disk drive or telecommunications modem, or other appliance such as, for example, a hearing aid, washing machine or microwave oven having an electronic controller.

Although specific embodiments have been illustrated and described herein, it will be appreciated by those skilled in the art having the benefit of this description that any equivalent arrangement may be substituted for the specific embodiments shown. The present invention is therefore limited only by the claims and equivalents thereof.

What is claimed is:

1. A method comprising:

placing a plurality of instructions into a control flow graph comprising a plurality of blocks of the instructions, the control flow graph defining a plurality of paths of control flow through the blocks of instructions;

building a list of candidate instructions to be scheduled into a target block in the control flow graph for execution comprising:
classifying a candidate instruction as M-ready in the target block if the candidate instruction does not have an unscheduled data predecessor in any path passing through the target block; and
classifying the candidate instruction as P-ready in the target block if the candidate instruction is not M-ready in the target block and there is at least one path passing through the target block on which there is no unscheduled data predecessor for the candidate instruction; and selecting one of the candidate instructions to be scheduled into the target block based on the readiness of the candidate instruction in the target block and on whether a single copy on a path property for the selected instruction in the target block will be maintained or terminated on one or more paths through the target block.

2. The method of claim 1, further comprising:

selecting path speculation compensation blocks in the control flow graph if one of the candidate instructions that is P-ready is selected to be scheduled into the target block comprising:
for each block in the control flow graph between the target block and a block containing the candidate instruction, selecting the block to be a candidate for a path speculation compensation copy of the selected candidate instruction if a useful path for the selected candidate instruction passes through both the block and the target block, and each useful path for the selected candidate instruction passing through the block has an unscheduled data predecessor for the selected candidate instruction, and the selected candidate instruction has not been scheduled on any path passing through the block; and
selecting the candidate block to be a path speculation compensation block if there are no other candidate blocks below the candidate block in the control flow graph; and placing a path speculation compensation copy of the selected candidate instruction into each path speculation compensation block.

3. The method of claim 1 wherein selecting one of the candidate instructions further comprises selecting one of the candidate instructions to be scheduled into the target block based on:

resource availability for the candidate instruction;
a critical path length of the candidate instruction;
a path probability for each path passing through the target block; and
a readiness of the candidate instruction in the target block.

4. A method comprising:
placing a plurality of instructions into a control flow graph comprising a plurality of blocks of the instructions, the control flow graph defining a plurality of paths of control flow through the blocks of instructions;
classifying a selected instruction in the control flow graph according to a readiness criteria for a target block in the control flow graph comprising:
classifying the selected instruction as M-ready in the target block if the selected instruction does not have an unscheduled data predecessor in any path passing through the target block; and
classifying the selected instruction as P-ready in the target block if the selected instruction is not M-ready in the target block and there is at least one path passing through the target block on which there is no unscheduled data predecessor for the selected instruction; and
scheduling the selected instruction into the target block in the control flow graph for execution based on the readiness of the selected instruction.

5. The method of claim 4 wherein scheduling the selected instruction comprises:
scheduling the selected instruction into the target block in the control flow graph for execution if the selected instruction is M-ready in the target block;
deciding whether to maintain or terminate a single copy on a path property for the selected instruction in the target block if the selected instruction is P-ready in the target block; and
scheduling the selected instruction into the target block in the control flow graph for execution based on the decision whether to maintain or terminate the single copy on a path property if the selected instruction is P-ready in the target block.

6. The method of claim 5 wherein deciding whether to maintain or terminate a single copy on a path property for the selected instruction further comprises deciding whether to maintain or terminate the single copy on a path property for the selected instruction in the target block in the control flow graph on one or more paths through the target block based on:
resource availability for the selected instruction;
a critical path length of the selected instruction; and
a path probability for each path passing through the target block.

7. The method of claim 5, further comprising:
selecting path speculation compensation blocks in the control flow graph if the selected instruction is P-ready in the target block and the selected instruction is scheduled into the target block comprising:
for each block in the control flow graph between the target block and a block containing the selected instruction, selecting the block to be a candidate for a path speculation compensation copy of the selected instruction if a useful path for the selected instruction passes through both the block and the target block, and each useful path for the selected instruction passing through the block has an unscheduled data predecessor for the selected instruction, and the selected instruction has not been scheduled on any path passing through the block; and
selecting the candidate block to be a path speculation compensation block if there are no other candidate blocks below the candidate block in the control flow graph; and placing a path speculation compensation copy of the selected instruction into each path speculation compensation block.

8. A computer-readable medium having computer-readable instructions for performing a method comprising:
placing a plurality of instructions into a control flow graph comprising a plurality of blocks of the instructions, the control flow graph defining a plurality of paths of control flow through the blocks of instructions;
building a list of candidate instructions to be scheduled into a target block in the control flow graph for execution comprising:
classifying a candidate instruction as M-ready in the target block if the candidate instruction does not have an unscheduled data predecessor in any path passing through the target block; and
classifying the candidate instruction as P-ready in the target block if the candidate instruction is not M-ready in the target block and there is at least one path passing through the target block on which there is no unscheduled data predecessor for the candidate instruction; and
selecting one of the candidate instructions to be scheduled into the target block based on the readiness of the candidate instruction in the target block and on whether a single copy on a path property for the selected instruction in the target block will be maintained or terminated on one or more paths through the target block.

9. The computer-readable medium of claim 8, further comprising computer-readable instructions to:
select path speculation compensation blocks in the control flow graph if one of the candidate instructions that is P-ready is selected to be scheduled into the target block comprising:
for each block in the control flow graph between the target block and a block containing the candidate instruction, select the block to be a candidate for a path speculation compensation copy of the selected candidate instruction if a useful path for the selected candidate instruction passes through both the block and the target block, and each useful path for the selected candidate instruction passing through the block has an unscheduled data predecessor for the selected candidate instruction, and the selected candidate instruction has not been scheduled on any path passing through the block; and
select the candidate block to be a path speculation compensation block if there are no other candidate blocks below the candidate block in the control flow graph; and
placing a path speculation compensation copy of the selected candidate instruction into each path speculation compensation block.

10. The computer-readable medium of claim 8 wherein selecting one of the candidate instructions further comprises selecting one of the candidate instructions to be scheduled into the target block based on:
resource availability for the candidate instruction;
a critical path length of the candidate instruction;
a path probability for each path passing through the target block; and
a readiness of the candidate instruction in the target block.

11. A computer-readable medium having computer-readable instructions for performing a method comprising:
placing a plurality of instructions into a control flow graph comprising a plurality or blocks of the instructions, the control flow graph defining a plurality of paths of control flow through the blocks of instructions;

classifying a selected instruction in the control flow graph according to a readiness criteria for a target block in the control flow graph comprising:
   classifying the selected instruction as M-ready in the target block if the selected instruction does not have an unscheduled data predecessor in any path passing through the target block; and
   classifying the selected instruction as P-ready in the target block if the selected instruction is not M-ready in the target block and there is at least one path passing through the target block on which there is no unscheduled data predecessor for the selected instruction; and
scheduling the selected instruction into the target block in the control flow graph for execution based on the readiness of the selected instruction.

12. The computer-readable medium of claim 11 wherein scheduling the selected instruction comprises:
   scheduling the selected instruction into the target block in the control flow graph for execution if the selected instruction is M-ready in the target block;
   deciding whether to maintain or terminate a single copy on a path property for the selected instruction in the target block if the selected instruction is P-ready in the target block; and
   scheduling the selected instruction into the target block in the control flow graph for execution based on the decision whether to maintain or terminate the single copy on a path property if the selected instruction is P-ready in the target block.

13. The computer-readable medium of claim 12 wherein deciding whether to maintain or terminate a single copy on a path property for the selected instruction further comprises deciding whether to maintain or terminate the single copy on a path property for the selected instruction in the target block in the control flow graph on one or more paths through the target block based on:
   resource availability for the selected instruction;
   a critical path length of the selected instruction; and
   a path probability for each path passing through the target block.

14. The computer-readable medium of claim 12, further comprising computer-readable instructions to:
   select path speculation compensation blocks in the control flow graph if the selected instruction is P-ready in the target block and the selected instruction is scheduled into the target block comprising:
      for each block in the control flow graph between the target block and a block containing the selected instruction, selecting the block to be a candidate for a path speculation compensation copy of the selected instruction if a useful path for the selected instruction passes through both the block and the target block, and each useful path for the selected instruction passing through the block has an unscheduled data predecessor for the selected instruction, and the selected instruction has not been scheduled on any path passing through the block; and
      selecting the candidate block to be a path speculation compensation block if there are no other candidate blocks below the candidate block in the control flow graph; and
   place a path speculation compensation copy of the selected instruction into each path speculation compensation block.

15. A processor system comprising elements to:
   place a plurality of instructions into a control flow graph comprising a plurality of blocks of the instructions the control flow graph defining a plurality of paths of control flow through the blocks of instructions;
   build a list of candidate instructions to be scheduled into a target block in the control flow graph for execution comprising:
      classify a candidate instruction as M-ready in the target block if the candidate instruction does not have an unscheduled data predecessor in any path passing through the target block; and
      classify the candidate instruction as P-ready in the target block if the candidate instruction is not M-ready in the target block and there is at least one path passing through the target block on which there is no unscheduled data predecessor for the candidate instruction; and
   select one of the candidate instructions to be scheduled into the target block based on the readiness of the candidate instruction in the target block and on whether a single copy on a path property for the selected instruction in the target block will be maintained or terminated on one or more paths through the target block.

16. The processor system of claim 15, further comprising elements to:
   select path speculation compensation blocks in the control flow graph if one of the candidate instructions that is P-ready is selected to be scheduled into the target block comprising:
      for each block in the control flow graph between the target block and a block containing the candidate instruction, selecting the block to be a candidate for a path speculation compensation copy of the selected candidate instruction if a useful path for the selected candidate instruction passes through both the block and the target block and each useful path for the selected candidate instruction passing through the block has an unscheduled data predecessor for the selected candidate instruction, and the selected candidate instruction has not been scheduled on any path passing through the block; and
      selecting the candidate block to be a path speculation compensation block if there are no other candidate blocks below the candidate block in the control (flow graph; and
   place a path speculation compensation copy of the selected candidate instruction into each path speculation compensation block.

17. The processor system of claim 15 wherein select one of the candidate instructions further comprises select one of the candidate instructions to be scheduled into the target block based on:
   resource availability for the candidate instruction;
   a critical path length of the candidate instruction;
   a path probability for each path passing through the target block; and
   a readiness of the candidate instruction in the target block.

18. The processor system of claim 15, further comprising:
   a processor;
   an input device coupled to the processor;
   an output device coupled to the processor;
   a memory device coupled to the processor; and
   a storage device coupled to the processor, the storage device including a computer-readable medium having computer-readable instructions.

* * * * *